United States Patent Office 3,451,875
Patented June 24, 1969

3,451,875

TAPE APPLYING MECHANISM EQUIPPED WITH MEANS TO ELIMINATE A TAPE FOLD

Winton Loveland, Freeport, and Saul Warshaw, New York, N.Y., assignors to Loveshaw Corporation, Farmingdale, N.Y., a corporation of New York Filed Oct. 20, 1965, Ser. No. 498,979
Int. Cl. B65b 51/06
U.S. Cl. 156—468 6 Claims

ABSTRACT OF THE DISCLOSURE

A gummed tape applying device for carton closing machines. It includes a pair of pivoted swinging arms opposed to each other with one ahead of the other in the direction of travel of the carton through the machine. Each swinging arm has a tape-engaging member which will wipe the tape progressively against carton outside faces including end walls and folded closing side flaps with end portions of the latter opposed in a longitudinal zone along which the tape is to be applied. Additional tape-engaging wipe-on means is floatingly supported in a position to intervene the wipe-on members of the swinging arms when the latter are spread apart in their tape applying action. This additional wipe-on means is elastically loaded to bias it toward the carton longitudinal zone so as to hold down substantially to a common plane the opposed end portions of the folded flaps as the arm wipe-on members wipe down thereagainst a length of the tape ahead of and behind this loaded wipe-on means. This prevents a loose loop of the tape being formed at the trailing carton corner over which it will be lapped that may otherwise be caused by spring up of the folded flap end portions as the back parts of the latter pass beyond the back arm wipe-on member. Other features of the invention appear in the following specification and accompanying drawings.

The present application is concerned with an improvement of the inventions described and claimed in our copending patent applications Ser. No. 139,676 of Sept. 21, 1961 for Tape Applying Mechanism, now Patent No. 3,236,716 of Feb. 22, 1966; and Ser. No. 477,870 of Aug. 6, 1965 for Tape Applying Mechanism Equipped with Tape Tensioning Means.

This invention is concerned with a machine for applying adhesive tape to packages having closing flaps, such as cartons. It is directed in particular to an assembly of wipe-on or wipe down rolls for smoothing out the tape and pressing it into firm engagement with the carton.

It is an object of the present invention to provide simple but effective means associated with such an assembly of wipe-on rolls which will assure application to each carton of the tape in taut condition free from undesirable wrinkles, loops or loose folds that might otherwise occur under certain conditions.

Another object of the invention is to provide such means in a form which will apply pressure to closing folded flaps of such package or carton as the tape is being applied by wipe-on rolls to prevent these flaps from springing out to pull into the length of tape an excess in a section thereof tending to form an undesirable loop or fold in the tape during application thereof.

A further object is to provide a structural embodiment of this improved means which may be readily constructed and will allow efficient use and operation thereof. Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figures 1, 2, 8, 8A:
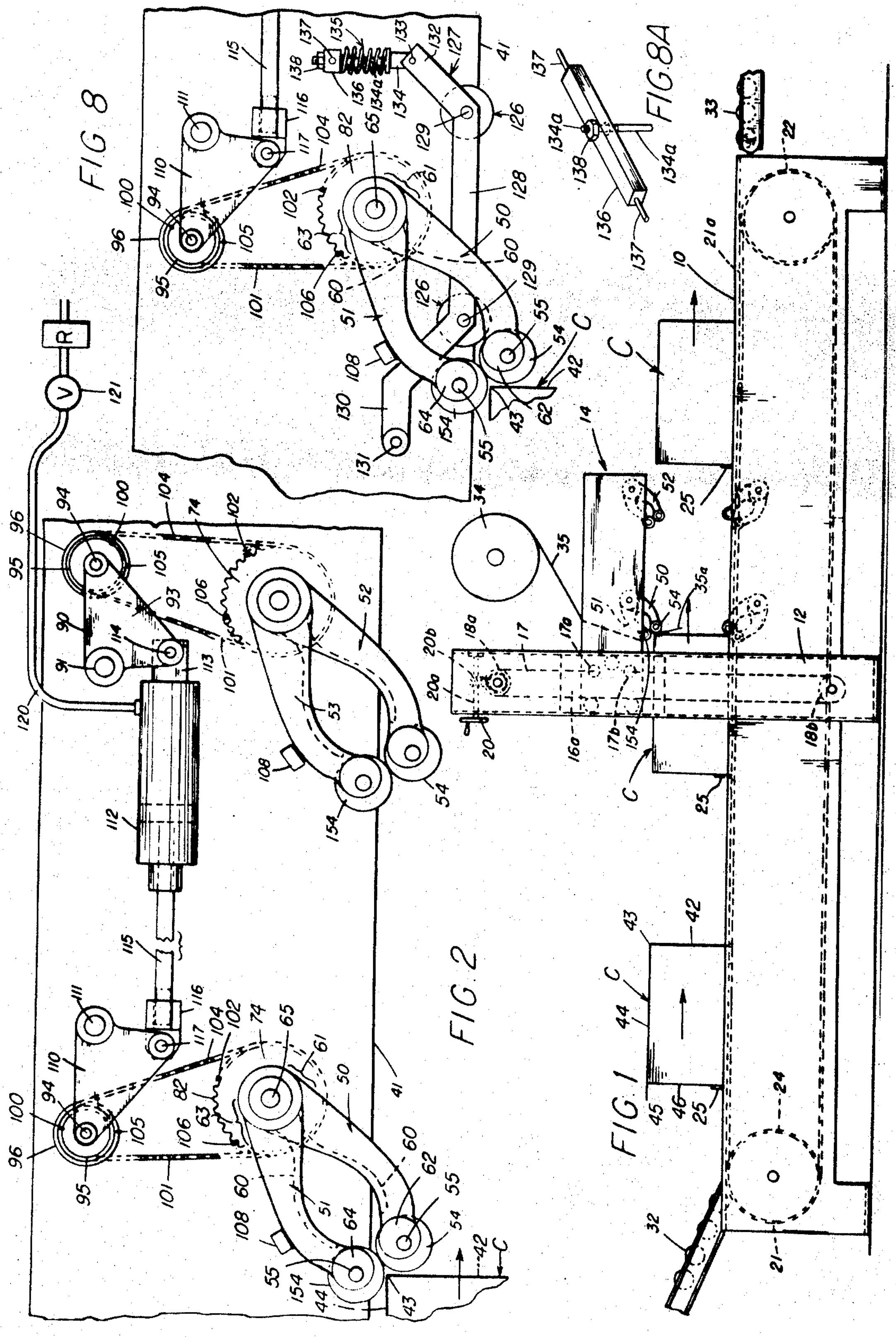
FIG. 1 is a view in elevation of one side of a tape applying machine embodying the features disclosed in our identified applications Ser. Nos. 139,676 and 477,870 with omission of various details but showing the general plan of the machine.
FIG. 2 is an enlarged view, with parts broken away, in elevation of the mechanism of this machine for applying the top tape with the front plate removed to show more clearly the wipe-on rolls and the supporting and operating mechanism therefor.
Figures 3, 4:
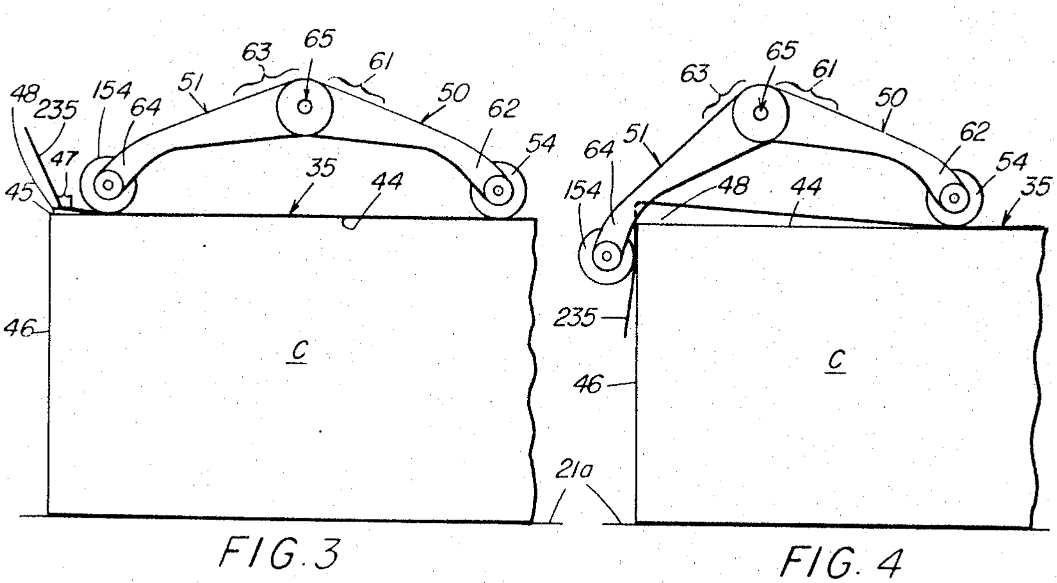
Figures 6, 7:
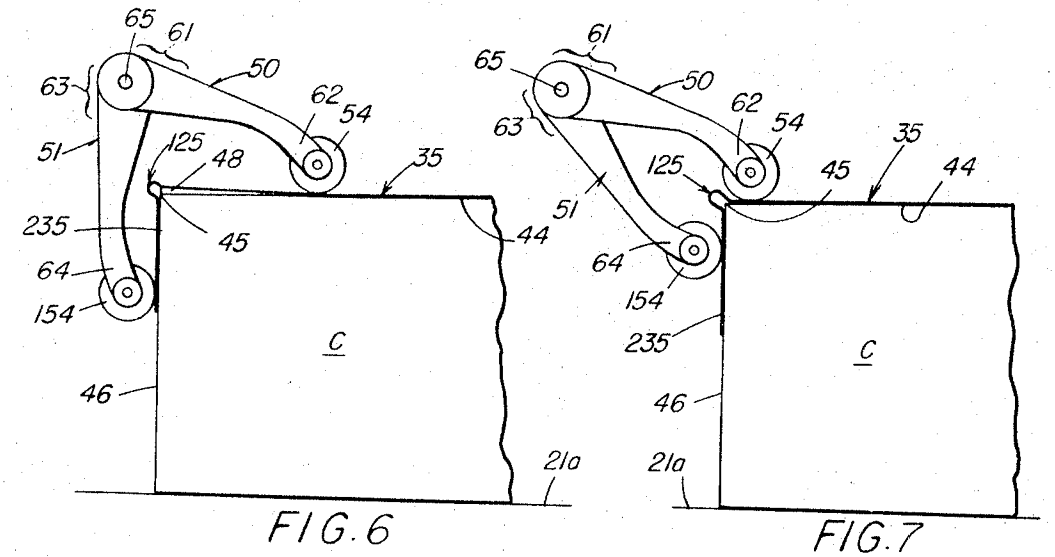
Figures 9, 10, 11, 12:
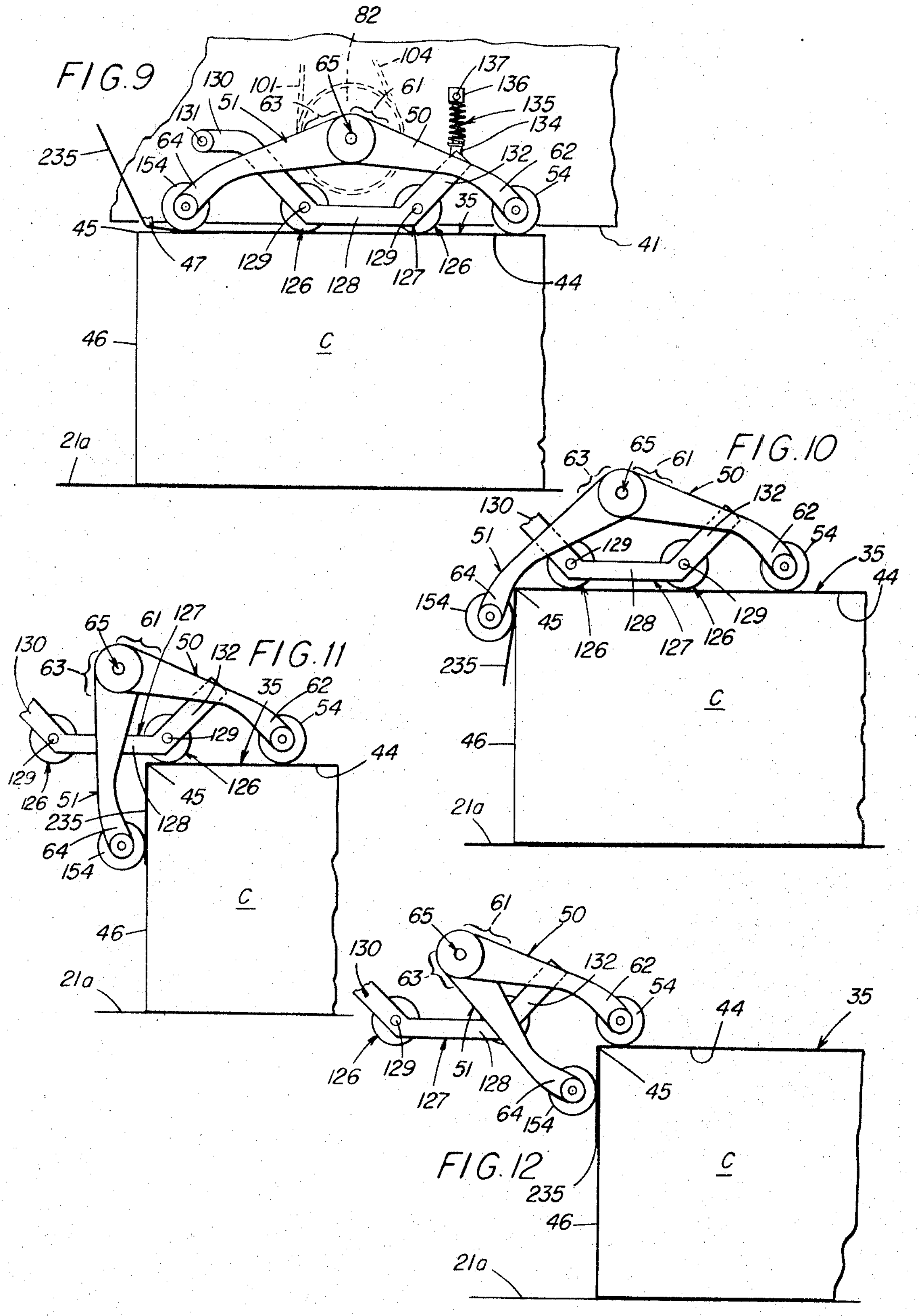

FIGS. 3 to 7 inclusive are diagrammatic views of portions of a closing flaps-equipped carton of conventional structure and associated wipe-on rolls illustrating application thereto of a length of gummed tape to secure the folded flaps in effective carton closing positions in a known manner which may tend to produce a loose loop or fold in the applied tape, parts being omitted and broken away for clarity;

FIG. 8 is a view similar to the left hand portion of FIG. 2, showing in association with tape wipe-on structure similar to that depicted in that figure an illustration of mechanism of the present invention for eliminating a fold in adhesive or gummed tape when applied by the pair of opposed wipe-on arms;

FIG. 8A is a perspective view of mounting and loading means provided at the trailing end of the fold eliminating means illustrated in FIG. 8;

FIG. 9 is a view similar to FIG. 3, showing operation of the added mechanism of the present invention;

FIG. 10 is a view similar to FIG. 4 further illustrating the advantageous operation of mechanism of the present invention;

FIG. 11 is a view similar to FIG. 6 illustrating the effective elimination by the use of mechanism of the present invention of a loop or fold in the tape at the top rear corner of the advancing package; and FIG. 12 is a view similar to FIG. 7, showing final application of the gummed tape to the top of the closed package with the elimination therefrom of any fold or loop in the tape by the employment of the present mechanism.

Referring to the drawings, in which like numerals identify similar parts throughout, it will be seen that the carton sealing machine, illustrated by way of example in FIG. 1, embodies a base section comprising particularly opposed and laterally-spaced side plates 10 and vertical plates or channels 12 secured thereto on which is mounted the upper tape applying means indicated generally at 14. The tape applying unit 14 will normally be made vertically adjustable on the supporting plates or stanchions 12. The drawings disclose one form of a suitable means for the purpose in which the unit 14 is mounted on elevator plates **16*a* vertically slidable in the side channels 12. A chain 17 has its ends secured in the plate 16*a* as is indicated at 17*a* and 17*b* and at the top is lapped around sprocket 18*a* secured on a cross shaft, and around a similar sprocket 18*b* at the bottom. The elevator plates 16*a*, and thereby the unit 14 are vertically adjusted through rotation of handwheel 20 mounted on a shaft 20*a* which carries a worm 20*b* meshing with a worm wheel secured on the cross shaft which supports the sprocket 18*a***. The machine will also embody other details which form no part of the present invention and details thereof are omitted in the interest of clarity. In general the machine as a whole may be of the type disclosed in our copending application Ser. No. 219,212 of Aug. 24, 1964 for Automatic Carton Closing Machine, now Patent No. 3,236,022, as representative of machines in which the present invention may be embodied.

The machine includes appropriate means for advancing therethrough packages, such as the cartons, indicated at C in the drawings. Such carton feeding means may comprise a pair of laterally-spaced and longitudinally-extending chains 21$a$ lapped about spaced sprockets mounted between the side plates 10, the sprockets at the right end being indicated at 22 and similar sprockets being mounted at the left end in FIG. 1 as is indicated at 24. The chains 21$a$ carry at suitably spaced positions a series of transverse bars or flights 25 each adapted to engage against a carton and advance it. The cartons rest on and slide along longitudinally-extending horizontal plates which may be supported by the side plates 10. The upper surfaces of such horizontal plates may carry laterally-spaced side flanges as guides for the carton which may be adjustable laterally through any suitable means to accommodate and guide cartons of different widths.

Suitable conveyor means may be provided at each end of the tape applying machine such as the series of feed rollers indicated at 32 in FIG. 1 for directing the cartons onto the carton advancing conveyor of the machine, and a similar type of roller conveyor indicated at 33 for receiving the taped cartons. Machines of this type commonly embody various other features such as means for folding down and holding the carton flaps preliminary to engaging the tape and tape applying mechanism, such as that illustrated in our copending patent application Ser. No. 219,212, now Patent No. 3,236,022.

The present machine is designed to apply tapes to both the upper and lower surfaces of the cartons, the tape supply roll for the upper tape applying means being indicated at 34 in FIG. 1 from which is drawn the gummed tape 35. Similar tape supply means are mounted in the base for supplying tape to the bottom of the carton. The tape most commonly used is of the type coated with a dried adhesive and the mechanism accordingly will include means for applying moisture to the surface of the adhesive and also devices for cutting off the tape at appropriate points. Such means and devices are well-known in the prior art and the present disclosure will not be encumbered with details thereof. The patent to Stagmeier 2,052,903, however, shows tape applying means including typical means for applying moistening fluid to the gum on the tape, and automatically operated tape cutter means.

Referring now to the detailed construction of the tape applying means the description will be directed particularly to the mechanism for applying the tape to the upper side of each carton C but it will be apparent that a similar mechanisms may be positioned below the path of the carton and may be constructed and operate similarly to the top tape applying means. The upper tape applying mechanism is mounted between a pair of similar, transversely-spaced, supporting plates, the far one of which is shown at 41 in FIG. 2, the near plate being removed in this figure to disclosure more clearly the operating elements. In the present embodiment there are two sets or pairs of wipe-on arms 50, 51 and 52, 53 respectively, each carrying at its outer end a tape engaging member comprising roll 54 or 154. The roll, 54 or 154, is composed of suitable resilient material such as rubber and is rotatable on a cross shaft 55. Each of the like arms 50 and 52 includes a pair of laterally-spaced arm sections connected together to form a unit as by a web 60 indicated in FIG. 2. Each of the mating arms 51 and 53 is similarly constructed, being a mirror image of the opposed arm, 50, or 52, paired therewith. The trailing arm 50 has a hub section 61 and a free portion terminating in a tip end 62, in the form of a fork, which rotatably supports wipe-on roll 54; and the arm 51 is of similar construction having a hub section 63 and a tip end 64 of its free portion which rotatably supports wipe-on roll 154.

Since the mechanism of the present invention is associated with the leading pair of opposed swinging, leading and trailing wipe-on arms 50 and 51, the following description and action of these arms as well as those of the mechanism of the present invention, will be confined thereto. The hub sections 61 and 63 of the wipe-on arms 50 and 51 respectively are swingably or pivotally mounted suitably between the near plate (not shown) and the far plate 41 by any suitable means. Such pivotal mounting does not require a common cross shaft for this purpose since their axes may be located in the same limited area while being offset a short distance for the cooperative tape wiping action. However, simplicity dictates the mounting of such arms upon a common cross shaft 65 as is more fully disclosed in our copending applications Ser. Nos. 139,676 and 477,870. The opposed wipe-on arms 50 and 51 are independently rotatable on such cross shaft 65.

The operating unit for swinging the wipe-on arms 50 and 51 on their pivots will now be described. Mounted between the front or near plate (not shown) and plate 41 is a forked bracket or bifurcated bell crank 110 shown in side elevation in FIG. 2. The bell crank 110 is adapted to swing on a pivot pin 111 secured between the near and far plates comprising the latter shown at 41 by screw studs extending through the plates into the ends of this pin. Both furcations of bell crank 110 are defined together by a pair of transversely-spaced flanges which extend laterally from pivot support pin 111 and mounted therein on a fixed pin 94 is a pair of sprockets 95 and 96 which may be made integral with each other or otherwise joined to rotate together. Suitable bearing means are provided for rotary support of sprockets 95 and 96 on pin 94. Power means is provided to swing the operating unit embodying the bell crank 110 in a clockwise direction on its pivot 111 as will shortly be described.

The hub section 61 of wipe-on arm 50 carries fixed thereto a sprocket 74 and the hub section 63 of wipe-on arm 51 carries a like sprocket 82 fixed to the latter. The sprockets 95 and 96 have a special flexible drive connection with sprockets 74 and 82 respectively. Secured to sprocket 95 at some suitable point in its periphery, such as at 100, is a chain 101 which extends around the sprocket from point 100 in a counterclockwise direction in FIG. 2 and continues down around sprocket 74 in a similar counterclockwise direction and is pinned thereto at an oppropriate point such as is indicated at 102. Similarly, but in a reverse direction, a chain 104 is pinned to sprocket 96 at a point, such as is indicated at 105, and extends therefrom around sprocket 96 in a clockwise direction and down and around sprocket 82 in a clockwise direction and is pinned to the latter as at 106. As a result of the arrangement swinging bell crank 110 about its pivot 111 in a clockwise direction serves to swing the wipe-on arms 50 and 51 into a closed scissor relation, such as it indicated in FIG. 2. It will be appreciated that other types of operative connections may be employed between the bell crank 90 and the arms 50 and 52, such as a gear connection in each case or other kinds of flexible means such as plain cables wrapped around pulleys or drums. In this connection it will be apparent that in most applications, for the elements shown as full sprockets, segments of suitable angular extent would be sufficient.

It is necessary that the scissor arms 50 and 51 not only be urged together in a closed scissor position but also that they normally be caused to move to an appropriate position for effective operative engagement by the advancing carton. Various means may be employed for this purpose but the present arrangement enables that function to be accomplished without added elements. Basically this in effected by making the radius or effective lever arm of one of the sprockets of a pair different from that of the other sprocket of that pair. In the present embodiment the sprocket 95 is made smaller than the sprocket 96 which causes greater torque on arm 50 than that on the opposed arm 51. As a consequence, these two wipe-on arms swing together in a clockwise direction until they meet an obstruction, such as a fixed limiting stop indicated at 108. Because of the shorter lever arm effective at sprocket 95 than at sprocket 96 a greater proportion of the force exerted on pivot point 94 is transferred to chain 101 than to chain 104. Consequently, when the two arms are free of a carton the arm 50 overpowers the opposing arm 51 and the two arms swing together in a clockwise direction until arm 51 meets the stop 108.

The operating means of the arms 52 and 53 is the same as that of the arms 50 and 51 except in the present embodiment the operating unit or bell crank 90 is mounted on pivot pin 91 in a reversed position and urged by the power operating means in a counterclockwise direction about this pivot pin.

In some cases one pair of wipe down or wipe-on rolls may be adequate but in the preferred form shown two pairs are employed which, however, function in the same manner. Also independent power means may be employed for each unit but the present system conveniently and economically employs a common source of power which is effective with equal force on the two units. The power means is of an impositive type adapted to apply an elastic pressure on the operating units 90 and 110 and through the operating connections to the respective pairs of wipe-on arms 50, 51 and 52, 53. The power means in the illustrated embodiment of the invention comprises a fluid pressure piston and cylinder arrangement suspended in a floating position between the two units, cylinder 112 having a finger 113 rigid therewith pivoted at 114 between the furcations of bell crank 90. Similarly piston rod 115 is threaded into a connector element 116 pivoted at 117 between the furcations of bell crank 110.

The cylinder 112 is connected to a source of pressure fluid by suitable means, such as a flexible conduit 120, to provide an elastically cushioned biasing means or drive. The supply line 120 will include suitable control means, such as a shut-off valve 121 and an adjustable pressure regulator "R" adapted to be manually set for the desired pressure. Other elastic power means, such as a spring, could be employed in place of the fluid pressure means but the present means is simple and readily adjusted for a desired selected pressure at the wipe-on rolls 54 and 154, and the pressure remains constant regardless of the position of the arms as distinguished from a spring the force of which varies with the amount of distortion.

Dependent upon the circumstances including the character of the cartons or like articles to which the tape is to be applied the complete machine may include wipe-on rolls located below the path of the bottom surface and adapted to apply a bottom tape. Such lower wipe-on rolls and associated mechanism may be identical with the upper operating means except reversed as to position.

As is indicated in FIG. 1 the receptive unit to which the gummed tape may be applied by mechanism shown in FIGS. 1 and 2 may be in the form of a rectangular carton C having receptive surfaces in the form of a substantially vertical leading or front end 42, a substantially flat lateral top 44 (intervened by a transverse top front corner 43), and a vertical trailing or rear end 46 (intervened by a transverse top rear corner 45). The carton top 44 conventionally includes a stack of closing folded lapped flaps comprising opposed front and back flaps over which are lapped folded side flaps 48 and 49 (see FIG. 5). FIGS. 3 to 7 inclusive illustrate a progressive procedure of applying a strip 35 of the gummed tape to the top of carton C while the adhesive thereof is still moist by means of the cooperative pair of pivoted arms 50 and 51 respectively carrying the wipe-on rolls 54 and 154, in a manner which may cause the formation of an undesirable transverse loop or fold in the tape. As the leading end of the tape 35 is supplied from suitable mechanism, such as supply roll 34, and a strip is severed therefrom by suitable guillotine means, its leading end **35*a* will be guided beneath a guide finger, shown at 47 in FIG. 3, to depend across the path of the leading end 42 of the advancing carton C as is illustrated in FIG. 1. As the advancing carton C moves forward to the vicinity of the wipe-on rolls 54 and 154 this leading end 35*a* of the tape strip 35, with its moistened adhesive-covered rear face opposed to surfaces of the advancing carton, will be draped across the transverse front top corner 43 of the carton and will be pressed to contact of the leading carton end 42 by the lower or trailing wipe-on roll 54 and against this transverse front top corner by the leading wipe-on roll 154**.

As the closed carton C advances further along its path of forward travel the resiliently biased arms 50 and 51, which respectively carry the wipe-on rolls 54 and 154, will be progressively spread apart to permit the trailing wipe-on roll 54 to advance vertically down along the leading end 135 of the tape strip and the vertical leading carton end wall 42 with wipe on of this leading end of the gummed tape while its adhesive is still moist and slippery. At the same time the leading wipe-on roll 154 advances back along the top 44, comprising the stack of folded closing flaps lapped in a generally common plane, to lay the intermediate portion of the tape strip 35 snugly thereover.

As the carton C further advances, the trailing wipe-on roll 54 will then rise up along the wiped on leading end **35*a* of the tape strip 35 and the vertical leading carton end wall 42 finally to roll back over the transverse top front corner 43. With still further advance of the leading wipe-on roll 154 back along the carton top face 44 the trailing wipe-on roll 54 will follow back along this top face to the relative positions illustrated in FIG. 3, with the wipe-on arms 50 and 51** fully scissored apart.

Figure 5:
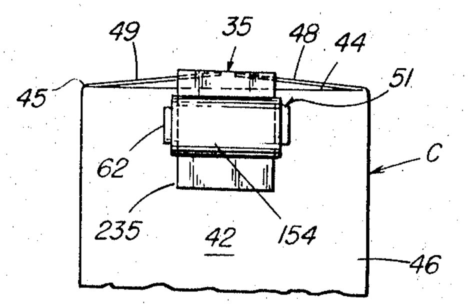

As has been previously indicated FIGS. 3 to 7 inclusive illustrate the problem solved by the provision of the mechanism of the present invention shown in FIGS. 8 to 12 inclusive. The problem is particularly prevalent with respect to so-called "overfilled" cartons wherein the contents are solidly packed and the top of the contents may be slightly mounded or extend slightly above the plane of the carton top defined by the break lines which delineate the flaps from the sidewalls and serve as hinge lines. When such flaps are folded down into closing positions to form a top closure stack, to be secured together for completing the carton closure, usually the front and back flaps are folded down in opposed relation and then the side flaps, such as those illustrated at 48 and 49 in FIG. 5, are lapped thereover. In such "overfilled" cartons there is a tendency for the internal pressure applied to the folded front and back flaps by the contents to cause the opposed edges of the side flaps 48 and 49 to spring up a short distance. When a strip of gummed tape is laid over the opposed end portions of such side flaps 48 and 49 in a longitudinal zone of the generally common plane of the closed carton top such springing up of these opposed edges will pull into the length of tape an excess in a section thereof tending to form an undesirable loop or fold during application of the tape length. As is illustrated in FIG. 3, it will be noted that such a tendency of side flap springing is indicated in the upper left hand portion near the top back corner 45. This springing is resisted by the advance of the tape wipe-on roll 154. As indicated in FIG. 4, when this leading wipe-on roll 154 progresses to beyond the top back corner 45 of the carton, so as then to roll down over the trailing end 235 of the tape for wiping it against the face of the carton back end 46 the side flaps 48 and 49 are permitted to spring up appreciably, as will be best seen in FIG. 5.

Progressive advance of the carton along its forward path of travel through the machine causes the leading wipe-on roll 154 to advance down along the back face 46 of the carton so as effectively to wipe on the terminal end portion 235 of the tape, as is illustrated in FIG. 6, with the trailing wipe-on roll 54 advancing further along the carton top face 44 with gradually closing scissor action developing with respect to the cooperating wipe-on arms 50 and 51. This further advance of the trailing wipe-on roll 54 will progressively force the upwardly sprung opposed edges of the side flaps 48 and 49 to be lowered from the positions of FIGS. 4 and 5 back down toward the general common plane to which the flaps were originally folded. As is illustrated in FIG. 6 the pull applied to the length of tape 35 in the action illustrated in FIGS. 4 and 5 produces an excess in the tape section at the carton top back corner 45 with such lowering of the opposed inner edges of the side flaps there to produce a loop or fold 125. As the advancing carton C travels further forward, so as to make imminent release from the wipe-on arms 50 and 51 and release of their rolls 54 and 154 from contact with the applied tape 35 and its trailing end 235, the roll 154 rises from the position illustrated in FIG. 6 to that illustrated in FIG. 7 for effective adherence of the tape trailing end to the carton back face 46 and the intermediate portion of the tape to the carton top 44 and the opposed edges of the side flaps 48 and 49 which have been forced down to the generally common plane, thereby leaving in the tape the unsightly and undesirable fold or loop 125. It is this problem which has been effectively solved in a relatively simple manner by the flap-biasing mechanism of the present invention.

As is illustrated in FIG. 8 such flap-biasing mechanism including flap holding means that are elastically loaded, and may be provided in the form of a plurality of transversely-extending rolls 126 which are movaby supported for motion toward the generally common plane of the closed top face 44 of the carton with a portion of such tape-engaging wipe-on means transversely lapping the longitudinal zone of the generally common plane occupied by the strip of gummed tape 35. These rolls 126 are located intermediate the wipe-on rolls 54 and 154 when the latter are spread apart to the maximum degree illustrated in FIG. 9 while both are in contact with the intermediate portion of the tape as it is being laid down over the opposed inside edges of the folded side flaps 48 and 49.

In other words, the lapping of this longitudinal medial zone by such flap biasing and holding means is provided opposite the general area of the support of the wipe-on arms 50 and 51 where they are pivotally mounted at 65 between the front frame plate (not shown) and its companion back plate 41 (see FIG. 8). Such flap biasing and holding rolls 126 may be biased in various alternative ways, such as by gravity loading, spring loading, elastic loading attainable by pressurized air as would be provided by a suitably mounted piston and cylinder device of the type illustrated at 112 in FIG. 2, or other alternative ways which should now readily occur to one skilled in the art.

Preferably, such flap biasing and holding means, which has proven to be effective and efficient, is in the form of a floating truck frame 127 which may comprise a pair of transversely-spaced side frame members 128 between which are supported a pair of cross shafts 129 on each of which is rotatably mounted one of the rolls 126 between such side frame members. The leading end of such truck frame structure may be in the form of arm extensions 130 of such side frame members 128 provided with transversely-aligned holes through which a transverse rod or tie bar 131 extends and with the ends of this rod or bar suitably supported or mounted to the front plate (not shown) and the companion back plate 41. The truck frame arm extensions 130 pivot about such tie rod 131 for up and down swinging motion. The trailing end of the truck frame 127 may be defined by a pair of transversely-spaced arm extensions 132 of the side frame members 128, which may be suitably tied together by a cross rod 133 on which is pivotally mounted an enlarged head of an arm 134 with this head supporting the lower end of a compression spring 135. The top end of the compression spring 135 is abutted against a pivoted block 136 pivotally supported at 137 between the transversely-spaced pair of frame plates including back plate 41. Thus the swinging action of the floating truck frame 127 is biased downwardly toward the closed top of any package or carton, such as that illustrated at C, as may be transported forward beneath its rolls 126 and the wipe-on rolls 54 and 154 of wipe-on arms 50 and 51.

In an operative embodiment of the improvement of the present invention the back frame plate 41 and the companion front plate (not shown) spaced transversely therefrom are located about five inches (5″) apart. The wipe-on rolls 54 and 154 are about three and three quarters inches (3¾″) long and the flap-biasing truck rolls 126 are about three quarters of an inch (¾″) long with the truck 127 having a transverse width of about an inch (1″). The transverse webs 60 of the wipe-on arms 50 and 51 are fore-shortened, as will be seen in FIG. 8, so that the truck 127 and its rolls 126 will slide through the forked ends of these arms above the latter rolls in the actions depicted in FIGS. 9 to 12 inclusive. In other words, the furcations 62 and 64 of the wipe-on rolls 50 and 51 are spaced transversely apart about three and three quarters inches (3¾″). In FIGS. 8 and 8A it is indicated that the major portion of the pivoted arm 134 is in the form of an upwardly-extending rod **134*a* projecting from the enlarged pivoted head thereof and about which helical compression spring 135 is arranged. The pivoted block 136 of this operative embodiment is of a transverse length of about five inches (5″) and carries one of a pair of pivot pins 137 on each end, with these pivot pins rotatably mounted in transversely aligned holes in the back frame plate 41 and its companion front frame plate (not shown). The top end of rod 134*a* is slidably received through a hole in pivoted block 136 and its top end is threaded to receive and carry about the latter a nut 138 for checking the length to which the compression spring 135 may expand in biasing the trailing end of the loaded truck 127** downwardly.

As will be seen from FIG. 9, as the leading wipe-on roll 154 advances along the strip of tape 35 to apply it over the opposed inside edges of the folded carton side flaps 48 and 49 the spring loaded truck frame 127 and its tape-engaging wipe-on rolls 126 apply pressure to these side flaps and the intervening tape as they advance therealong over the closed carton top 44. As the leading wipe-on roll 154 advances beyond the top back corner 45 of the forwardly traveling carton C the wipe-on roll 154 moves thereover to roll down along the trailing end 235 of the tape and the carton back face 46 to lay this tape end down over the latter. At this time pressure is applied to the intermediate section of the tape 35 and the opposed inside edges of the carton side flaps 48 and 49 to keep the latter snugged down to substantial alignment in the generally common plane of the closed carton top. This effective action is particularly apparent from FIG. 11, and it will be seen therefrom and from FIG. 10 that there is no excessive tape length at the carton top back corner 45 there to define a loop or fold, such as that illustrated at 125 in FIGS. 6 and 7. As the leading wipe-on roll 154 progresses downwardly along the trailing end 235 of the tape 35 firmly to apply it to the carton back face 46 the tape is laid down tautly across the closed carton top face 44, about the corner 45 and against the back face 46. Finally, upon withdrawal of the advancing carton C the leading wipe-on roll 154 reverses its direction to wipe back up along the applied trailing end of the tape 235 for final separation in the vicinity of the carton top back corner 45 as the trailing wipe-on roll 54 is freed at this point from the carton top face 44 and the applied intermediate section of the tape 35.

The loaded leading flap-biasing roll 126 which immediately follows the leading wipe-on roll 154 is of chief importance in performing the desired flap-biasing function and should be so located relative to this wipe-on roll as to be as near thereto as it is practically possible to locate it to be immediately behind this wipe-on roll when the latter is moving back along the carton top 44 over the opposed edges of the flaps 48 and 49.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In a gummed tape applying device comprising (A) a pair of opposed swinging leading and trailing arms each having a free portion provided with a tape-engaging wipe-on member and a hub section including a pivot axis, and (B) means swingably supporting said arm hub sections with their pivot axes located in a common area offset from a longitudinally-extending path of forward travel of a package having an opposed face provided with closing side flaps folded transversely toward each other in a generally common plane in a longitudinal zone of which opposed end portions of said flaps are located, and an angularly related trailing end face, said flap-defined face and end face being adapted to have a length of tape successively wiped thereon by said wipe-on members with the tape lapping the end portions of said folded flaps, the improvement which comprises (a) flap holding means including (i) tape-engaging wipe-on means movably supported for motion toward said plane and having at least a portion transversely lapping said longitudinal zone opposite said arm supporting means for intervening said arm wipe-on members when the latter are spread longitudinally apart in applying tape to the opposed flap-equipped face of the package, and (ii) means elastically loading said wipe-on means to bias the latter toward said longitudinal zone for holding down substantially to the common plane the opposed end portions of said folded side flaps as said arm wipe-on members wipe down against the latter the length of tape ahead of and behind said loaded wipe-on means.

2. The tape applying device as defined in claim 1 in which said flap holding means embodies said wipe-on means in the form of a plurality of transversely-extending rolls.

3. The tape applying device as defined in claim 2 in which said wipe-on means is in the form of a floating truck frame supporting said rolls for free rotation, and said loading means is in a form to apply pressure elastically to said truck frame.

4. The tape applying device as defined in claim 3 in which said truck frame has a leading end pivotally mounted on a transverse axis for swinging motion toward said plane.

5. The tape applying device as defined in claim 4 in which said loading means is provided by spring means biasing said truck frame toward the package travel path.

6. The tape applying device as defined in claim 5 in which said truck frame has a trailing back end and said spring means is in the form of compression spring structure mounted between said arm supporting means and said truck frame back end.

References Cited

UNITED STATES PATENTS

| | | | |
|---|---|---|---|
| 2,643,016 | 6/1953 | Steckling | 156—468 |
| 2,649,221 | 8/1953 | Wagner et al. | 156—468 |
| 2,787,396 | 4/1957 | Christensson | 156—486 XR |
| 2,799,419 | 7/1957 | Scheib | 156—486 XR |
| 2,906,426 | 9/1959 | Fritzinger | 156—468 |

EARL M. BERGERT, *Primary Examiner.*

M. E. McCAMISH, *Assistant Examiner.*

U.S. Cl. X.R.

156—489